Figure 1:
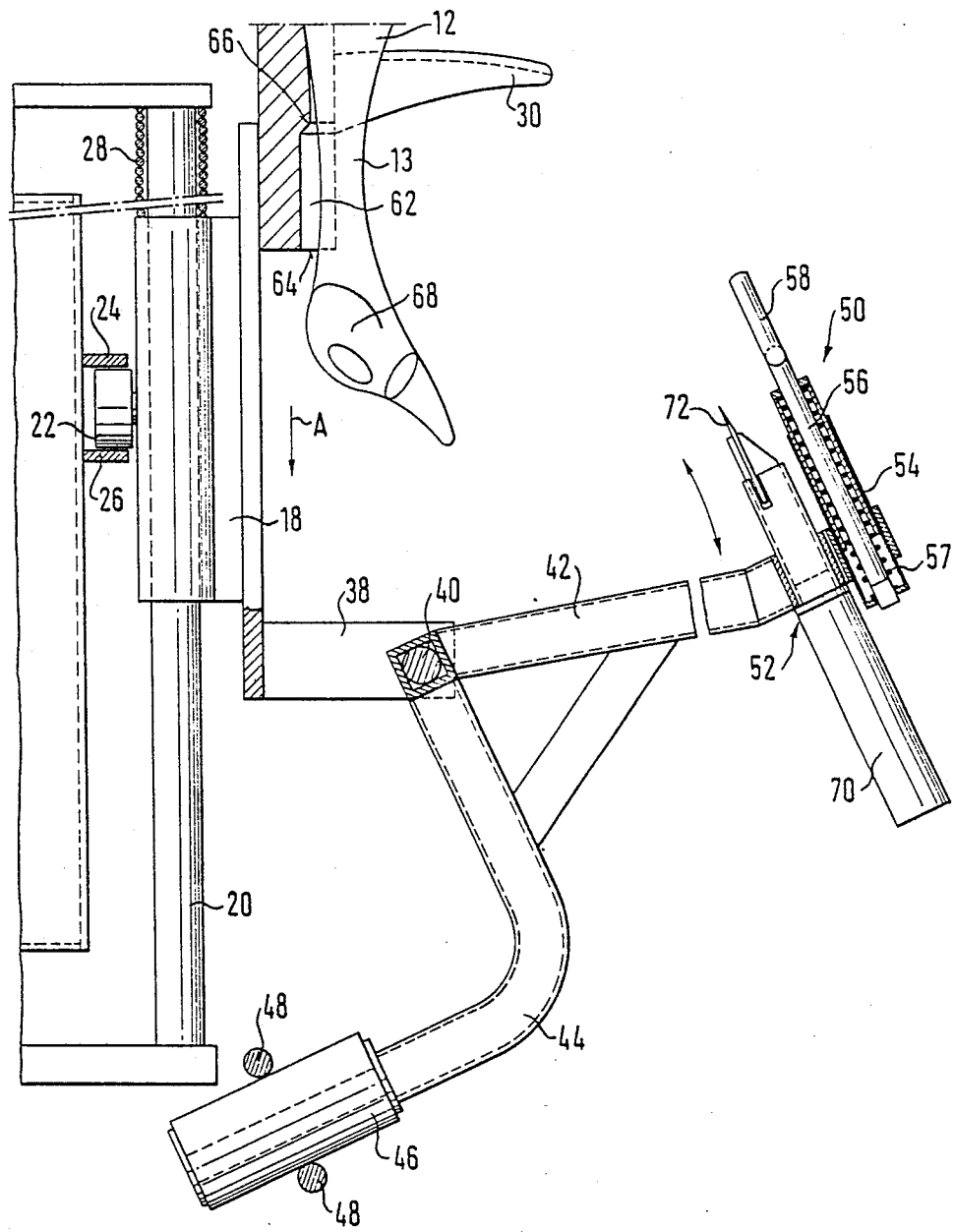

United States Patent [19]

Markert

[11] Patent Number: 4,894,885

[45] Date of Patent: Jan. 23, 1990

[54] KILLING DEVICE FOR POULTRY

[75] Inventor: Heinrich W. Markert, Otterlo, Netherlands

[73] Assignee: Stork PMT B.V., Netherlands

[21] Appl. No.: 187,200

[22] Filed: Apr. 28, 1988

[30] Foreign Application Priority Data

Apr. 28, 1987 [EP] European Pat. Off. ......... 87106151.1

[51] Int. Cl.⁴ .......................................... A22C 21/00
[52] U.S. Cl. ............................................. 17/11; 17/45
[58] Field of Search .................. 17/12, 11, 45, 44.1, 17/52

[56] References Cited

U.S. PATENT DOCUMENTS

| | | |
|---|---|---|
| 2,152,083 | 3/1939 | Onorato . |
| 3,765,055 | 10/1973 | Lewis . |
| 3,805,328 | 4/1974 | Strandine . |
| 4,097,960 | 7/1978 | Graham et al. ......................... 17/11 |
| 4,249,285 | 2/1981 | Sheehan . |
| 4,354,296 | 10/1982 | Robinson . |
| 4,619,017 | 10/1986 | Simmons ................................ 17/11 |
| 4,730,365 | 3/1988 | Simmons ................................ 17/12 |

FOREIGN PATENT DOCUMENTS

| | | |
|---|---|---|
| 1905983 | 9/1969 | Fed. Rep. of Germany . |
| 7500030 | 6/1976 | Netherlands . |
| 7904602 | 12/1980 | Netherlands . |
| 7904779 | 12/1980 | Netherlands . |
| 8401690 | 5/1984 | Netherlands . |
| 2095535 | 6/1982 | United Kingdom . |

Primary Examiner—Willis Little
Attorney, Agent, or Firm—Sughrue, Mion, Zinn, Macpeak & Seas

[57] ABSTRACT

The invention relates to a killing device for poultry with a cutting slot moving with and aligned transversely to the transporting direction of the sideways conveyed animals (12), a head aligning means (62) located below the catching slot and a holding means (58) acting on the neck. This results in an always reliable severing of the carotids resulting in a reliable bleeding out of the poultry animal.

15 Claims, 3 Drawing Sheets

KILLING DEVICE FOR POULTRY

The invention relates to a killing device for animals conveyed one behind the other by the legs with the head hanging downwards, in particular for winged animals such as chickens, turkeys, etc., with a catching device for catching, holding and stretching of the neck through catching of the head and with a cutting means particularly for the severing of the carotids. Such devices are known as linearly working killing devices where of course the animals are already anesthetized when they reach the killing device.

In such a known killing device two guide rods running in their sense of length towards each other are provided, which are aligned in the sense of length of the animal conveying arrangement. The head of the animal is captured between the guide rods and then the neck is stretched, after which it reaches the area of the knife which penetrates the neck so as to sever the carotid. In this known killing device, in which different conveying systems are used, the animals reach the knife in irregular alignment, i.e. in an uncontrolled alignment. The consequence of this is that sometimes the skin is only cut, but no severing of the carotids results. This in turn has the consequence that insufficient bleeding out of the animals occurs, so that such animals are not accepted by the veterinary surgeon.

When the animals are conveyed whilst hung by the legs, they are always so conveyed that the side of the animals, i.e. the position where the wings are located, points to the front or to the rear when one views the direction of motion of the animals. As consequence of this, a part of the wing is likewise often caught in the guide rods and is then cut by the knife.

To eliminate these disadvantages, it is the object of the invention to create a killing device of the above-mentioned type in which the animals can be aligned reliably exactly to the knife, with the consequence that a reliable cutting-through of the carotids, where the remaining part of the animal is handled with care, can be practiced in such a way, that a complete bleeding out of the animals is ensured.

This object is solved according to the invention, in that the catching means comprises a catching slot essentially transversely allinged to the conveying direction, closed at one end and open at the other, and movable with the animal conveyor; that the open end of the catching slot is closable with a neck-holding means which is movable towards and away from the catching slot, and with which the neck of the animal can be pushed against the closed end of the slot, where a head aligning means is provided; that the catching slot is arranged movable in the direction of length of the body of the hanging animal and that the cutting means is likewise movable with the animal conveyor.

With this arrangement the neck of the animal is securely caught by the catching slot in a certain prealignment, preferably with the back of the animal in the direction towards the closed end of the catching slot, without the danger existing to the effect that parts of the wings get into the catching slot. When the neck holding means presses the neck of the animal against the closed end of the catching slot and the catching slot is moved in the direction towards the head which is caught therein, the head comes into a particular aligning means. At the moment the cutting means acts on the relevant neck area, as close as possible to the head, this neck area is reliably aligned to the knife, so that a careful but guaranteed effective severing of the carotids is possible with the consequence that the animal can be completely bled out.

These kinds of killing devices are preferably arranged in a plurality one behind the other in a row, preferably in a closed loop in which the possibility exists that these killing devices are active either in a linear conveying section or in a rerouting conveying section (carousel principle). Here the so-called carousel principle is preferred, because with this an as simple as possible cam-controlled positive control (forcibly) of the mechanically movable parts is effected in a simple manner.

So that a secure catching of the animal neck is then ensured, when the animal is brought into the area of the catching slot by the conveyor, the catching slot tapers from the open end towards the closed end.

The head-aligning means consists preferably of a recess in the form of a groove located under the closed end of the catching slot. When, in particular with the downward movement of the catching slot, the head of the animal reaches this recess, an exact alignment of the head and with this the neck area to be cut in relationship to an either fixed knife or one which moves towards the neck results. In the case of a fixed knife, but one which moves in the direction of the animal conveyor, the neck of the animal is pushed against the knife, so that the cutting process is thereby ensured during the transportation of the animal. This therefore means that the killing process, with the killing devices that move with the animal conveyor arranged in a row, takes place continuously.

The catching slot is movable under positive control and therewith, for adjusting to variously sized animals, is spring-loaded or weighted-loaded, free of the positive control. This means, that the catching slot can free itself from the positive control and due to the spring, depending on the size of the animal, a setting outside the positive control is possible.

The neck-holding means consists preferably of a U-shaped retaining bar which is so arranged, that it is movable in the area above the catching slot, which it overlaps.

The cutting means are preferably located below this U-shaped retaining bar and are movable together with this in the direction towards the neck, in which normally the back of the neck and therefore the back of the head of the animal is directed towards the closed end of the catching slot and the knife engages on the front side of the neck as close as possible to the head of the animal.

The cutting means comprises a knife, preferably driven separately, which is essentially movable linearly towards the neck of the animal. The drive of the knife results advantageously pneumatically in such a way, that the beginning of cutting and/or the cutting force and/or the cutting depth and/or the cutting duration can be set as desired, so that the cutting-through of the carotids ensues in exactly that moment when the head or the neck of the animal in the desired manner is exactly aligned and securely held.

The knife itself is preferably aligned in a V-shape, so that the cutting edges approach each other in the direction towards the animal. For the simplification of production with larger animals it is provided for to implement a two-piece knife. Then the knife has two external cutting edges to engage with both carotids.

To ensure a better penetration and cutting of the knife into the neck of the animal every external cutting edge of the knives ends in a point, where these points lie at a distance from one another transversely to the direction of movement of the knife. Between these points a preferably rounded section, positioned to the rear, is located, whose inner edge at least partially forms a further cutting edge and in fact preferably in such a way that to the inside of each of the points cutting edge positioned on the inside tapers off, whereby the base of the rounded section can then be obtuse. These cutting edges lying on the inner side are preferably formed as protrusions, so that they run inclined to the mentioned points as well as to the base of the rounded section.

The catching slot is preferably a part of a linearly movable carriage in which the head aligning recess is also formed and to which a pivoting lever is hinged and which carries the neck holding means and/or the cutting means.

So that a secure holding of the neck on the one hand and a adjustment to variously sized animals on the other hand is possible, the neck holding means or the U-shaped bar forming this is spring-mounted.

Figure 2:
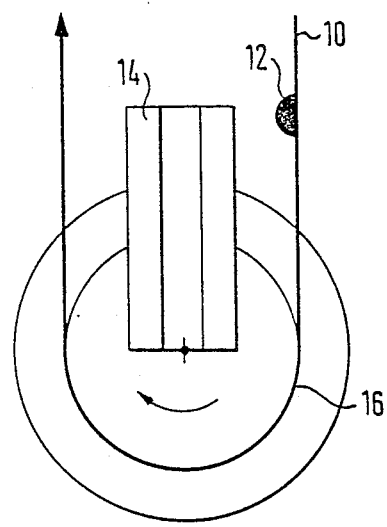
Figure 5:
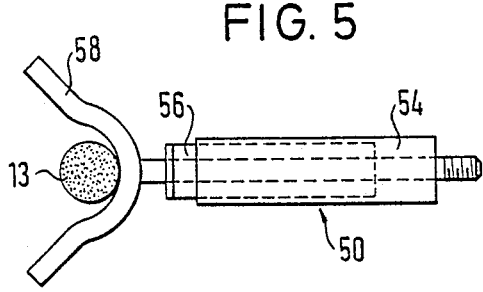
Figure 4:
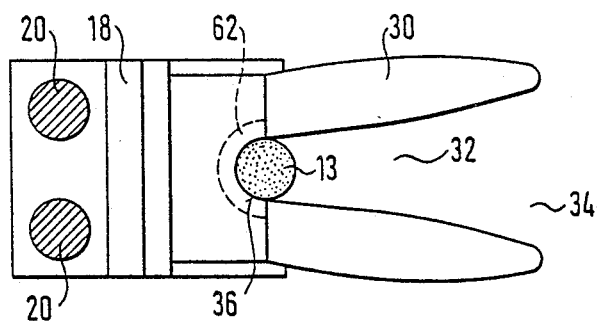
Figure 6:
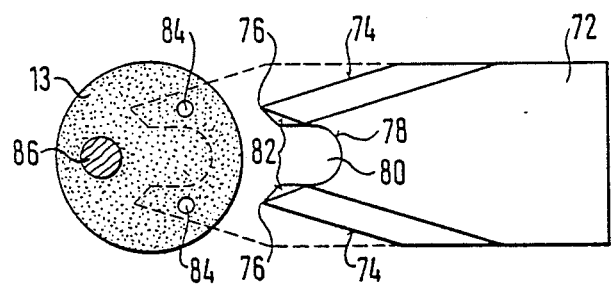
Figure 3:
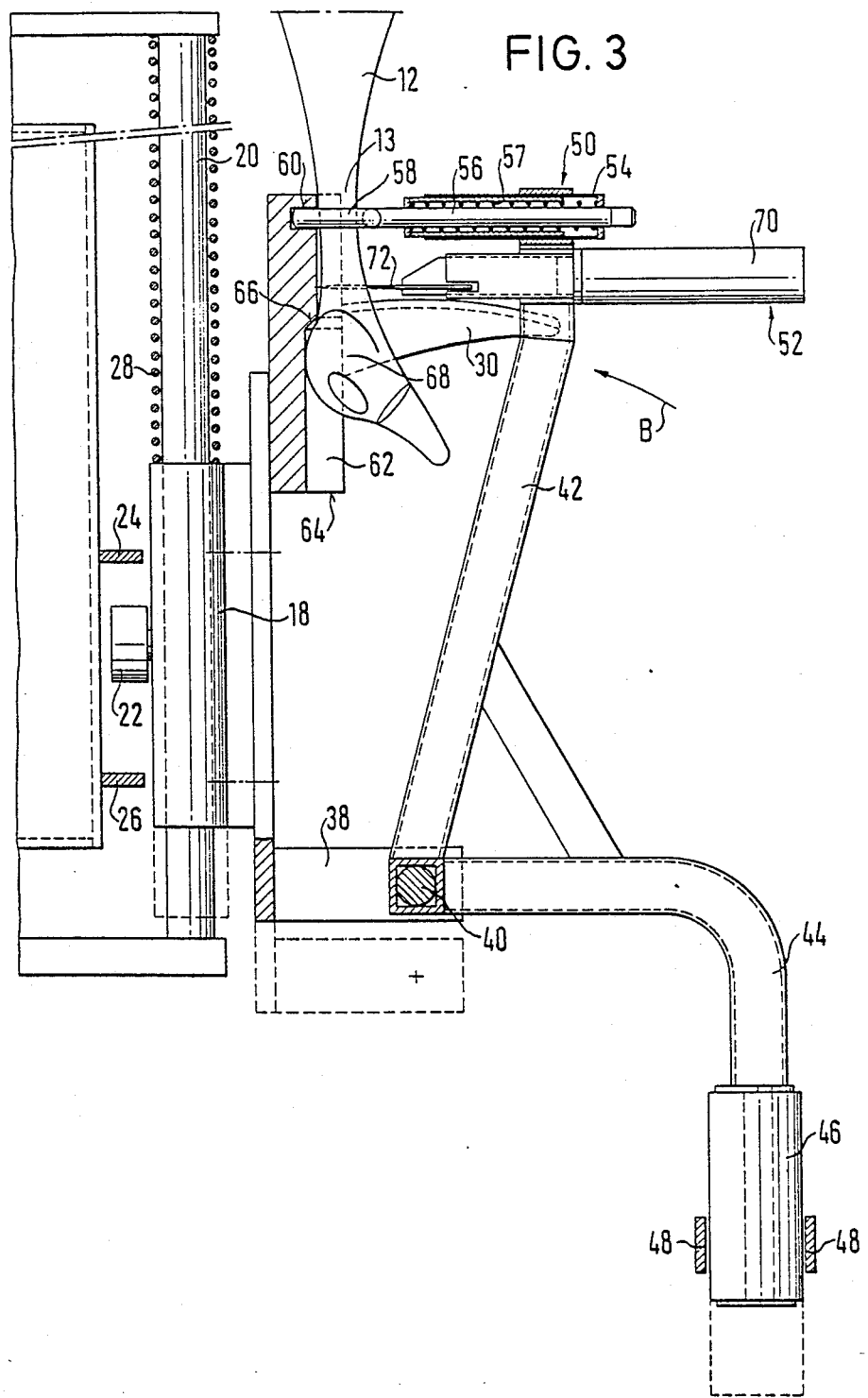

Further details, features and advantages of the invention are revealed in the following description of the embodiments shown purely schematically in the diagrams, in which:

FIG. 1 shows a schematic side view of a killing device with the neck of a poultry animal arranged in position, FIG. 2 a purely schematic depiction of a carousel machine, FIG. 3 shows a side view of the killing device in FIG. 1 in the cutting position, FIG. 4 a plan view onto a sliding carriage forming the catching slot, FIG. 5 shows a partial view of the retaining bar of the neck holding arrangement, and FIG. 6 a plan view onto the knife in relation to the neck of the poultry animal.

The killing device described here purely an example works in a continuous operation together with a conveyor means, preferably formed as an overhead conveyor, for the continuously conveyed animals, which are hung by the feet with their head down and which have been previously anesthetized.

Such killing devices separately described below are preferably arranged in a closed loop and move at least in the working area with the same speed as the previously mentioned overhead conveyor means (animal conveyor). Here the possibility exists to allow for the killing device to become effective in an area of linear movement of the circulation path or in an area of rerouting. Here the arrangement of the killing devices is preferably of the carousel type of operation such that the killing devices are arranged movable on a circular path about a vertically aligned axis, in which the animal conveyor is aligned so that it is moved to and away from a certain area of the circulation area and so that the hanging animals can be worked on in this particular peripheral area by the killing devices which move with them.

Such a carousel model is purely schematically shown in FIG. 2, in actual fact as a clockwise rotating model. In FIG. 2 the overhead conveyor (animal conveyor) is given the reference character 10. The animals (12) are normally conveyed in such a way that they are aligned with the back tending to the inside. A support is characterized with the reference number 14, which holds a vertical rotation axis (not clearly shown). On the schematically shown circular path (16), killing devices are arranged at a certain distance from each other which move on this circular path, as shown in FIGS. 1 and 3.

Now the killing device is particularly described according to FIGS. 1 and 3.

A carriage (18) is essentially arranged in a vertical sense along two guide rods (20). The movement of the carriage (18) is effected by a positive control with cams. This positive control with cams consists of a roller (22) situated on the carriage (18) as well as two fixed cam guide rails (24 and 26) which are arranged on a circular path about the not depicted perpendicular shaft of the carousel. The guidance of the cam guide rails is such that a time-related fixed movement of the carriage in relation to the other parts of the killing device results. As FIG. 3 shows, the cam guide rails (24 and 26) lie further apart in a lower region so that the roller (22) is not in contact with either one or the other cam guide rail. The purpose of this is that in this area a spring (28) acting on the carriage can be come so effective that, via a further construction according to FIG. 3 described hereafter, the carriage can be effective on the head of the animal for adaptation to various animal sizes, without this being obstructed by one of the cam guide rails.

A catch (30) is located on the upper side of the carriage (18) which forms a catching slot (32), as can be seen from FIG. 4. This catching slot consists of a wide open end (34) and the narrower closed end (36), where it has a rounded section, so that the catching slot according to claim 4 tapers from right to left. This allows for a better catching of the neck (13) of the animal (12) shown schematically in FIG. 4.

A projection (38) is located on the lower end of the carriage (18) to which, via an axis (40), a pivoting lever (42) is hinged. A control lever (44) with a cam following roller (46) located on its free end is securely fixed with this pivoting lever (42). This cam following rollers (46) move between two equidistantly spaced apart cam guide rails (48) which are so fixed and constructed that with movement of the killing device, the pivoting lever (42) is moved under control in a timewise and locationwise predetermined manner. A neck holding means (50) and a cutting means (52) are located in a combined fashion at the free end of the pivoting lever (42). Both are arranged at a suitable distance from each other so that, according to the representation in FIG. 3 the carotids can be severed at the desired point.

The neck-holding means is separately shown in FIG. 5 and comprises of a cylindrical housing (54), which can be seen from FIG. 1 and in particular from FIG. 5. A push-rod (56) moves within the cylinder (54) and is biased towards the left according to the representation in FIG. 5 by means of a spring (57), i.e. in the direction towards the neck (13) of the animal. Of course the push-rod is held in the cylinder in such a way that it is not completely pushed out of the cylinder. The possibility exists though, that the push-rod can move against a spring tension by a certain amount in the inside of the cylinder, so that in adjustment to the variously sized necks a secure hold of the neck of the animal can be ensured. For the supporting of the neck an open, essentially U-shaped retaining bar (58) is mounted to the free end of the push-rod (56).

Above the catch (30) a locking recess (60) is formed, into which the free end of the essentially U-shaped retaining bar (58), shown in the end position in FIG. 3, can engage. Directly beneath the cutting slot (32), located in the carriage (18), is a head-aligning recess (62)

which is suited to the head shape of the animal. This resting recess is open at the lower end at (64) and has at its upper end a shoulder or step (66).

Just as the head-aligning recess (62) is suited to the head-shape of the animal, the closed inner end (36) is suited to the neck (13) with its recess. With this, according to the cutting position of the animal shown in FIG. 3, the head (68) lies against the shoulder (66) and lies in the recess (62) (groove) exactly aligned and positioned to the cutting means. In this position the neck is securely held by the retaining bar (58) so that an exact and clean severing of the carotids and with this a complete bleeding out is ensured.

The cutting means (52) comprises a pneumatic cylinder (70) which preferably linearly drives a knife (72). With this the pneumatic control is to be carried out in such a way that the initiation of the cutting and/or the cutting force and/or the cutting depth and/or the cutting duration, i.e. the time the knife remains in the neck, can be controlled according to desire and according to the requirements.

The means are made in such a way that the back of the head of the bird, according to the representation in FIG. 3, comes to rest in the aligning recess (62) in such a way that the knife (72) cuts as close as possible to the neck on the front side so as to reliably engage with the carotids.

In principle, the possibility also exists, and this is also included in the claims, to fasten a bird, which has been rotated 180°, in position whereby of course the aligning apparatus must be accordingly adjusted. In this context the knife can be fixedly arranged and a separate pushing device move the aligned neck in the direction towards the knife.

The knife (72) is shown in enlarged scale form in FIG. 6. In the cutting direction the front side of the knife (72) tapers conically and has two outer cutting edges (74). These each run to a point (76) which lie transversely to the direction of motion at a certain distance from one another. A rearwardly running recess (80) is located between the points (76), with a rounding-off (78), the recess being obtuse in the region of the rounding-off (78), but further forward in the region of the points (76), it has protruding cutters (82). The outer cutting edges (74) serve for the severing of the carotids (84) and the protruding cutters (82) make the penetration of the knives into the neck (13) of the animal easier. The recess has furthermore the advantage, that with the possibility of a further penetration requirement into the neck of the animal no contact with the cervical vertebra (86) comes about. A contact with the wind pipe and gullet should be avoided, as later an easier removal of the inlets is then possible. The position of penetration condition of the knife in the neck (13) of the animal is shown in dotted lines in FIG. 6.

The mode of operation of the killing device shall now be described in the following.

When an animal with its head hanging downwards moves together with the animal conveyor in a direction towards the circular path (16), there ensues an automatic engagement of the neck (13) of the animal (12) in a catching slot (32) of the catch (30), which moves on a circular path and which extends and opens itself radially outwards in such a way, that the sideways, forward moving animal moves with its back to the closed end (36) of the catching slot (32). There then ensues without or if needs be at the same time with the movement of the carriage (18) in the direction of the arrow A in FIG. 1 a pivoting of the pivoting lever (42) anticlockwise in the direction of the arrow B in FIG. 3 in such a way, that the retaining bar (58) closes the open end (34) of the catching slot (32) with an overlapping process above the catch (30), so that the neck (13) of the animal (12) cannot slip out. On the one hand the retaining bar (58) then moves further into the end position shown in FIG. 3, in which the free end of the retaining bar (58) grips into the locking recess (60), whereby the retaining bar (58) adjusts to the various neck thicknesses via the spring (54). On the other hand, a further movement of the carriage (18) ensues downwardly in the direction of the arrow A. The head (68) of the animal, that was previously located outside the aligning recess (62) according to FIG. 1, can push itself, with the downward movement of the aligning recess (62), in the direction of the arrow A with the rear section into the open end (64) of the aligning recess (62) until the rear of the head comes to rest on the shoulder (66). With this an exact alignment of the head and of the neck and a stretching of the neck ensues, so that with the neck in a tense condition the head is exactly aligned, which one after the other, reliably results automatically for every animal. This alignment in relation to the knife (72) is always the same, since the knife is located on the moving sliding carriage (18). Due to the spacing of the cam guide rails (24 and 26) (FIG. 3) and the action of the spring (28) the carriage (18) has a clearance of movement shown in dotted lines in FIG. 3 which ensures that even with different sized animals the head position shown in FIG. 3 is ensured.

In FIG. 3 the forwardly advanced knife (72) is shown in dotted lines, and it is distinguishable that the knife always engages near the head, always in the same position, in a favourable manner.

When the cutting process is concluded, the pivoting lever (42) pivots back again into the starting position shown in FIG. 1 and with the further circular movement of the killing device and a moving-off from the animal conveyor, the slipping-out of the animal from the catching slot automatically ensues.

What is claimed:

1. A killing device for animals such as poultry secured by the legs to a conveyor with the head and neck hanging downward and being conveyed one behind the other along a conveyor path, the device comprising movable support means, catching means mounted on said support means for movement along said conveyor path for catching, holding and stretching of the neck, said catching means including means defining a catching slot disposed essentially transversely relative to the conveying path with said slot being closed at one end and open at the other end, neck holding means pivoted on said catching means for movement toward and away from said catching slot for engaging the neck and pushing said neck against the closed end of said catching slot, head aligning means located on said catching means below said catching slot, means for movably mounting said catching means on said support means for movement substantially perpendicular to the conveyor path along the length of the neck for locating the head in the head-aligning means and cutting means pivotally mounted on said catching means for movement toward and away from said catching slot.

2. A killing device as set forth in claim 1, wherein a plurality of said devices are arranged in spaced relation on a path adjacent said conveyor means.

3. A killing device as set forth in claim 2, wherein said path is a closed circular path.

4. A killing device as set forth in claim 1, wherein said catching slot tapers from the open end towards the closed end.

5. A killing device as set forth in claim 1, wherein said head aligning means is comprised of a recess formed in said catching means below the closed end of said catching slot.

6. A killing device as set forth in claim 1, wherein spring means are provided on said support means for biasing said catching means to accommodate different sized animals.

7. A killing device as set forth in claim 1, wherein said neck holding means is comprised of an essentially U-shaped retaining bar engageable with said catching means above said catching slot in overlying relation thereto.

8. A killing device as set forth in claim 7, wherein said cutting means is disposed beneath said retaining bar on a common support for movement with said retaining bar.

9. A killing device as set forth in claim 6, wherein said cutting means includes a knife having separate drive means for moving said knife along a linear path.

10. A killing device as set forth in claim 9, wherein said separate device means for said knife is comprised of pneumatically operated means.

11. A killing device as set forth in claim 9, wherein said knife has a V-shaped configuration with two external cutting edges.

12. A killing device as set forth in claim 11, wherein each external cutting edge of said knife ends in a point, said points being spaced apart in a direction transversely to the direction of motion of the knife with a recess between said points rearwardly thereof with an inner edge of said recess at least partially forming a further cutting edge.

13. A killing device as set forth in claim 1, wherein said catching means is comprised of a linearly movable carriage in which said head aligning recess is formed and wherein said neck holding means and said cutting means are supported on a lever pivotally supported on said carriage.

14. A killing device as set forth in claim 1, wherein said neck holding means includes spring means for biasing said neck holding means towards said catching slot.

15. A killing device as set forth in claim 1, wherein a locking recess is formed in said catching means above said catching slot for receiving said neck holding means.

* * * * *